Feb. 23, 1932.   F. SEIPP   1,846,365
APPARATUS FOR SEPARATING SUSPENDED MATERIAL FROM GASES
Filed Feb. 27, 1930
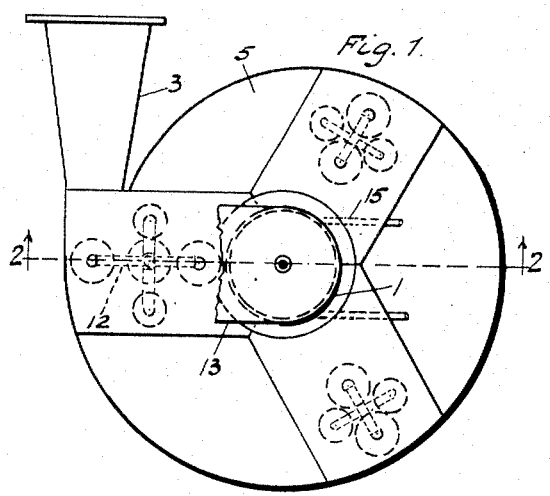
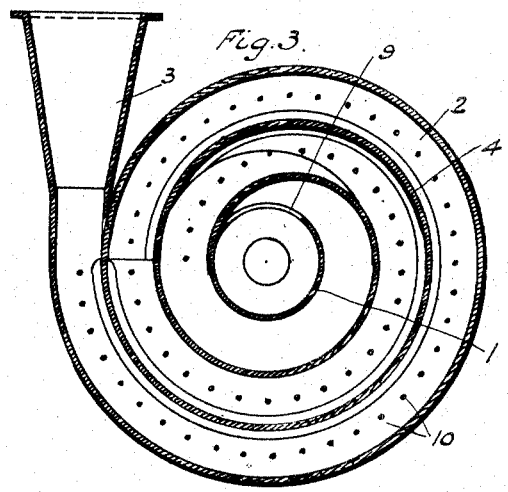
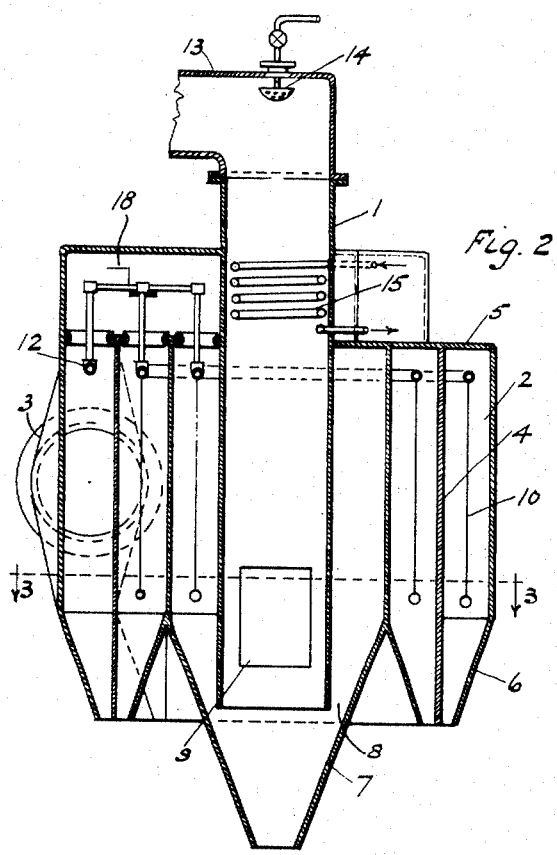
INVENTOR:
Franz Seipp
BY
ATTORNEYS.

Patented Feb. 23, 1932

1,846,365

UNITED STATES PATENT OFFICE

FRANZ SEIPP, OF FRANKFORT-ON-THE-MAIN, GERMANY, ASSIGNOR TO INTERNATIONAL PRECIPITATION COMPANY, OF LOS ANGELES, CALIFORNIA, A CORPORATION OF CALIFORNIA

APPARATUS FOR SEPARATING SUSPENDED MATERIAL FROM GASES

Application filed February 27, 1930, Serial No. 431,853, and in Germany March 27, 1929.

This invention relates to means for separation of suspended material from gases and particularly to improved means whereby the separation is effected by the combined action of electrical and centrifugal operations.

The main object of the invention is to provide for effective separation of suspended material from gases, by means of a compact and inexpensive apparatus.

A further object of the invention is to provide for pretreatment of the gases in such an apparatus, for example, by humidification, heating or cooling.

The accompanying drawings illustrate an embodiment of my invention, and referring thereto:

Fig. 1 is a plan view of the apparatus.
Fig. 2 is a section on line 2—2 in Fig. 1.
Fig. 3 is a section on line 3—3 in Fig. 2.

The invention comprises a vertical stand pipe 1 serving as an inlet pipe, and a spiral flue 2 extending spirally around the pipe 1 and communicating at its inner end with said pipe and at its outer end with an outlet pipe 3. Said spiral flue is formed between or defined by the convolutions of a spiral wall 4 which is secured at its inner end to pipe 1 and at its top to a horizontal top plate 5 also secured to said pipe. The spiral flue 2 may comprise several convolutions, as shown. The bottom of spiral flue 2 is formed with conical or tapering hoppers or collecting chambers 6 for receiving and delivering the separated material. A central conical hopper 7 extends directly below the pipe 1 and is adapted to receive and deliver any solid or liquid material separated in the pipe 1. The lower end of pipe 1 extends near the wall of hopper 7 forming a passage 8 between the lower end of pipe 1 and the wall of hopper 7, and an opening 9 may be provided in the lower part of pipe 1, permitting passage of gases from pipe 1 to the spiral flue 2. Some gas will, however, generally also pass from pipe 1 through the open lower end thereof and upwardly through the passage 8.

Discharge electrodes 10 are mounted in the spiral flue 2, throughout all or part of its length, and are supported on insulated supports 12 in any suitable manner. Said discharge electrodes may consist of wires, rods, or chains etc., as used in the art of electrical precipitation, and are suitably spaced from the walls of the spiral flue, said walls acting as collecting electrodes. The walls of the flue are preferably grounded and the discharge electrodes 10 are connected by wire 18 to any suitable source of high tension current, preferably unidirectional. For example, the wire 18 may be connected through current rectifying means to the high tension winding of a step-up transformer whose primary winding is connected to an alternating current supply circuit.

The stand pipe 1 may serve as a support for the entire structure and may be connected to an inlet flue 13 for supplying the gas to be treated. Said pipe may also serve as a chamber for pre-treatment of the gas. For example, water or other liquid may be distributed into said pipe by a spray device 14 at the upper end of the pipe, to humidify the gases or the suspended material, or to wash some of the material from the gases. Or the gases passing in pipe 1 may be heated or cooled by a suitable heating or cooling medium, passed through a coil 15 or other means in heat transmitting relation therewith. By such a construction, the pipe 1 may be made to serve as a pretreating means as well as an inlet pipe.

In the operation of the apparatus, the gas to be treated is admitted through the inlet pipe 13 and passes down through pipe 1, then through opening 9 and passage 8, to the inner end of spiral flue 2, the reversal or change of direction of the gas at this point assisting in the separation of some of the suspended material (especially the heavier or larger particles thereof) which falls to the hopper or collecting chamber 7. The gases in passing through the spiral flue 2 are subjected to centrifugal action, due to continuous curvature of the spiral flue, and are also subjected to electrical action causing agglomeration or precipitation or both agglomeration and precipitation of the suspended material.

I claim:

1. An apparatus for separating suspended material from gases, comprising a curved vertically extending wall defining a spiral passage, an inlet pipe disposed within the inner end of said wall and extending vertically downward to adjacent the bottom of said wall and communicating with said passage only adjacent the lower end thereof, hopper means disposed beneath said spiral passage and said inlet pipe, the lower ends of said passage and inlet pipe being entirely open to permit material to fall therefrom into said hopper means, and discharge electrode means extending within said spiral passage and insulated from said curved wall, said wall constituting collecting electrode means as well as curved deflector means for the gases.

2. An apparatus as set forth in claim 1 and comprising, in addition, liquid spray means mounted within said inlet pipe above the point of communication thereof with said spiral passage.

3. An apparatus as set forth in claim 1 and comprising, in addition, temperature controlling means mounted within said inlet pipe above the point of communication thereof with said spiral passage.

In testimony whereof I have hereunto subscribed my name this 14th day of February, 1930.

FRANZ SEIPP.